United States Patent [19]
Jana et al.

[11] Patent Number: 6,156,875
[45] Date of Patent: *Dec. 5, 2000

[54] METHOD OF COAGULATING AND ISOLATING GRAFT COPOLYMERS FROM LATICES

[75] Inventors: Sadhan Chandra Jana, Niskayuna; Irene Dris, Clifton Park; Gary Stephen Balch, Mechanicville, all of N.Y.

[73] Assignee: General Electric Company, Schenectady, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/105,120

[22] Filed: Jun. 25, 1998

[51] Int. Cl.⁷ ......................................................... C08F 6/18
[52] U.S. Cl. ................................... 528/502 F; 528/502 R
[58] Field of Search ............................. 528/502 F, 502 R

[56] References Cited

U.S. PATENT DOCUMENTS

| | | | |
|---|---|---|---|
| 4,299,952 | 11/1981 | Pingel et al. | 528/502 F |
| 4,623,678 | 11/1986 | Moore et al. | 523/335 |
| 4,668,738 | 5/1987 | Lee et al. | 523/335 |
| 5,025,044 | 6/1991 | Christell et al. | 528/502 C |
| 5,698,666 | 12/1997 | Burroway et al. | 528/487 |

*Primary Examiner*—James J. Seidleck
*Assistant Examiner*—Olga Asinovsky
*Attorney, Agent, or Firm*—Noreen C. Johnson; Douglas E. Stoner

[57] ABSTRACT

Graft copolymer particles comprising an elastomeric base polymer such as polybutadiene and grafted chains of a thermoplastic, non-elastomeric polymer such as styrene-acrylonitrile are coagulated for isolation from aqueous emulsion by subjecting the emulsion to mechanical shear in the absence of chemical coagulants at a temperature greater than or equal to the glass transition temperature of the thermoplastic, non-elastomeric portion of the copolymer.

12 Claims, No Drawings

METHOD OF COAGULATING AND ISOLATING GRAFT COPOLYMERS FROM LATICES

BACKGROUND OF THE INVENTION

This invention relates to polymer emulsions, and more particularly to the isolation of polymers therefrom by coagulation.

Many addition polymers are routinely prepared in the form of an aqueous emulsion or latex, containing polymer particles of a size typically in the range of 1–500 nm suspended in water. It is necessary to isolate said polymer from the emulsion for use. Isolation by coagulation, in which the polymer forms aggregated particles of a size larger than that of the emulsion particles, is usually most convenient.

U.S. Pat. Nos. 4,299,952 and 4,668,738 describe a shear coagulation method, in which a polymer latex is subjected to mechanical shear to form a paste. The paste is then treated with steam under pressure with further shearing, to raise the latex temperature to about 40–90° C. and thereby achieve coagulation. It is usually found, however, that the polymer particle size in the paste is essentially the same as in the latex and that an additional isolation step is necessary to convert the polymer into crumbs which can be ground into a powder.

Other methods of isolation involve a step of chemical treatment of the emulsion, which is normally prepared and exists in alkaline form. Treatment reagents include acidic materials such as gaseous carbon dioxide and sulfuric acid as disclosed in U.S. Pat. Nos. 4,623,678 and 5,698,666 respectively; asphalt as disclosed in U.S. Pat. No. 5,025,044; and polyvalent metal salts such as zinc chloride, magnesium chloride or calcium chloride.

The chemical treatment methods have the disadvantage that various chemicals, such as the coagulating chemicals themselves and surfactants employed in formation of the emulsion, remain in the isolated polymer and can cause problems during processing and/or compounding. Asphalt is useful as a treatment agent only when a blend of the polymer and asphalt is desired, which is often not the case.

It remains of interest, therefore, to develop methods for polymer isolation from emulsion which produce large, easily processed polymer particles of convenient size for use without the necessity of multiple treatment steps during or after coagulation.

SUMMARY OF THE INVENTION

The present invention is a method for isolating graft copolymer particles from an aqueous emulsion of a copolymer comprising elastomeric base polymer chains and thermoplastic, non-elastomeric polymer side chains grafted thereon. Said method comprises subjecting said emulsion to mechanical shear in the absence of chemical coagulants, at least part of said emulsion being at a temperature greater than or equal to the glass transition temperature of the thermoplastic, non-elastomeric portion of said copolymer.

DETAILED DESCRIPTION; PREFERRED EMBODIMENTS

The copolymer compositions which may be treated by the method of this invention include those which are prepared by graft polymerization of thermoplastic, non-elastomeric side chains on an elastomeric base polymer. Illustrative elastomeric base polymers are diene polymers such as polybutadiene, polyisoprene and polychloroprene and acrylic elastomers such as poly(butyl acrylate). They are characterized by low glass transition temperatures, most often below 0° C.

The grafted side chains are thermoplastic but not elastomeric in nature; i.e., they have glass transition temperatures above 0° C., most often above about 75° C. and preferably in the range of about 90–150° C. Those skilled in the art will be aware of suitable side chains and the method for their production. The preferred side chains are generally derived from at least one alkenylaromatic compound and at least one ethylenically unsaturated nitrile, most preferably styrene and acrylonitrile. Thus, the preferred emulsion polymers include the well known acrylonitrile-butadiene-styrene (ABS) and acrylonitrile-butadiene-acrylate (ASA) resins.

Such graft copolymers most often have two glass transition temperatures, one characteristic of the elastomeric base polymer and the other of the thermoplastic, non-elastomeric side chains. Those skilled in the art will understand, therefore, that the softening properties imparted to the graft copolymer by the side chains will include those characteristic of said side chains when they exist as separate polymer molecules, independent of the base polymer.

The emulsions treated by the method of the invention are aqueous emulsions in which the copolymer is present as the discontinuous phase, typically in a proportion (solids content) of about 30–40% of said emulsion and having a mean particle size in the range of about 1–500 nm (i.e., about 0.001–0.5 micron). The emulsion may contain other materials conventional in such emulsions, including surfactants (emulsifiers). The pH of the emulsion is on the basic side, typically in the range of about 8–10.

According to the invention, the emulsion is subjected to mechanical shear. Such shear may be provided by any vessel known to be capable of providing it, including batch mixers with efficient agitation means, disc-pack processors and extruders.

Extruders are often preferred. Illustrations of suitable extruders are single screw kneading extruders; counterrotating, non-intermeshing twin screw extruders having screws which include forward-flighted compounders, cylindrical bushings and/or left-handed screw elements; corotating, intermeshing twin screw extruders; and extruders having screws which include at least one and preferably at least two sections of kneading block elements.

Shearing is performed in the absence of chemical coagulants such as acids or polyvalent metal salts, at least in part at a temperature greater than or equal to the glass transition temperature of the non-elastomeric portion of the copolymer (hereinafter sometimes "copolymer Tg"). The qualification "at least in part" can have several aspects. One such aspect is that a portion but not all of the copolymer particles are subjected to the copolymer Tg, as a result of localized superheating. When this is the case, only a portion of the copolymer particles may undergo coagulation. It is preferred, therefore, that the entire emulsion be at the copolymer Tg.

Another aspect, of particular significance when an extruder is employed to provide the shear, is that only a portion of said extruder, generally a predominant portion until coagulation of the copolymer is complete, may be at the copolymer Tg. By reason of the continuous nature of extrusion, this will generally result in all polymer particles being subjected to said copolymer Tg for a portion of the extrusion time. This aspect is particularly effective and thus is often preferred.

The copolymer Tg is, for all practical purposes, equal to the glass transition temperature of the thermoplastic, non-elastomeric portion of the copolymer. For a typical styrene-acrylonitrile (SAN) copolymer and an ABS copolymer prepared therefrom, the copolymer Tg is typically on the order of 105° C. Thus, shearing temperatures of at least 100° C. and preferably in the range of about 105–110° C. are preferred when the grafted chains are SAN copolymer chains. If necessary, pressure may be applied during the shearing operation to enable such temperatures to be attained.

The method of the invention typically produces a solid copolymer phase having a mean particle size in the range of about 100–500 microns (particle size distribution being non-critical for the purposes of the invention), suspended in a liquid aqueous phase. Copolymer of such a particle size is easily isolated by conventional separation operations such as filtration or centrifugation. When an extruder is used to impart shear to the emulsion, the aqueous phase may be removed in large part through a conventional dewatering port.

A further advantage of the invention is that the copolymer is free from chemical contamination by surfactants and by such otherwise necessary coagulating reagents as acids or salts. Freedom from chemical contamination can be important for optimization of the properties of the copolymer.

It has been shown by experimentation that mechanical shearing of a copolymer latex without heating, or with heating to a temperature below the copolymer Tg, causes flocculation of a paste. The particle size of the flocculated material is the same as that of the copolymer in the latex. This is true at latex pH values at least in the range of 7.2–9.2. Thus, the heating step of the method of the invention is advantageous in causing coagulation inexpensively, without the necessity of further processing operations.

The invention is illustrated by the following examples. All parts, percentages and ratios are by weight.

EXAMPLE 1

The aqueous latex employed contained 35.5% of ABS copolymer having a pH of 9.2, a mean particle size of about 70 nm and consisting of 50% butadiene and 50% grafted styrene and acrylonitrile units, the ratio of styrene to acrylonitrile units being 3:1. About 2 liters of the latex was charged to a high intensity batch mixer manufactured by Shar Inc., having a deaerating impeller to impart shear. The vessel was heated, without stirring, in an oil bath maintained at 140° C. until the latex temperature was 99.9° C. as determined by a thermocouple dipped into the latex. The latex was then sheared for 8 minutes at an impeller velocity of 3600 rpm, with continued heating. The copolymer coagulated and was separated from the liquid phase; it was found to have a mean particle size of 395.5 microns.

Similar processes employing latex temperatures of 90° C. or less produced flocculated masses having particle sizes on the order of 1 micron, rather than coagulated copolymer. It is believed that localized superheating occurred at a latex temperature of 99.9° C., producing temperatures above the SAN glass transition temperature of 105° C. Heating of the entire mass at higher temperatures was impossible since the vessel was not adapted to operation under pressure.

EXAMPLE 2

A 30-mm 10-barrel twin screw extruder was designed with a first zone including a feed port, second and third zones having conveying screw elements, a fourth zone having a kneading element, a fifth zone with a conveying element, sixth and seventh zones having kneading elements, eighth and ninth zones having a kneading block flanked by two conveying blocks with a dewatering port in the ninth zone, and a tenth zone configured for solid copolymer isolation. The extruder was charged with an ABS copolymer similar to that of Example 1. Heating was applied according to the profile in Table I, with actual copolymer temperature being monitored by thermocouples in the zone barrels. The screws were rotated at 500 rpm with a torque at about 20% of the maximum. After removal of most of the aqueous phase through the dewatering port, the copolymer was collected in coagulated form. It had a mean particle size in the range of 250–350 microns. Coagulation was found to be complete as early as the seventh barrel.

TABLE I

| Zone | Set temp., ° C. | Polymer temp., ° C. |
| --- | --- | --- |
| First | 25 | 25 |
| Second | 100 | 78 |
| Third | 120 | 102 |
| Fourth | 120 | 106 |
| Fifth | 130 | 123 |
| Sixth | 140 | 134 |
| Seventh | 140 | 132 |
| Eighth | 100 | 100 |
| Ninth | NH* | 97 |
| Tenth | NH | 90 |

*Not heated.

EXAMPLE 3

The equipment and procedure of Example 2 were employed to coagulate an ASA resin of similar composition to the ABS resin. The product was a similar coagulated copolymer. The temperature profile of the extruder is given in Table II.

TABLE II

| Zone | Set temp., ° C. | Polymer temp., ° C. |
| --- | --- | --- |
| First | 25 | 25 |
| Second | 100 | 76 |
| Third | 120 | 99 |
| Fourth | 120 | 104 |
| Fifth | 130 | 116 |
| Sixth | 140 | 123 |
| Seventh | 140 | 127 |
| Eighth | 100 | 100 |
| Ninth | NH | 98 |
| Tenth | NH | 90 |

What is claimed is:

1. A method for isolating graft copolymer particles in one step from an aqueous emulsion of a copolymer comprising elastomeric base polymer chains and thermoplastic, non-elastomeric polymer side chains grafted thereon said method comprising subjecting said emulsion to mechanical shear in the absence of chemical coagulants, at least part of said emulsion being at a temperature greater than or equal to the glass transition temperature of the thermoplastic, non-elastomeric portion of said copolymer.

2. A method according to claim 1 wherein the elastomeric base polymer is a diene polymer or an acrylic elastomer.

3. A method according to claim 2 wherein the grafted side chains have a glass transition temperature above about 75° C.

4. A method according to claim 3 wherein the grafted side chains have a glass transition temperature in the range of about 90–150° C.

5. A method according to claim 2 wherein the grafted side chains are derived from at least one alkenylaromatic compound and at least one ethylenically unsaturated nitrile.

6. A method according to claim 5 wherein the alkenylaromatic compound is styrene and the ethylenically unsaturated nitrile is acrylonitrile.

7. A method according to claim 1 wherein the mean particle size of the copolymer in said emulsion is in the range of about 1–500 nm.

8. A method according to claim 7 wherein the mean particle size of the isolated copolymer is in the range of about 100–500 microns.

9. A method according to claim 1 further comprising the step of separating said copolymer from an aqueous phase.

10. A method according to claim 1 which is utilizes an extruder to effect heating and shearing.

11. A method according to claim 1 in which the mechanical shear to which the latex having particle size from 0.0001 to 0.5 microns is subjected to effect coagulation is provided by the action of one or more kneading zones in an extruder.

12. A method for isolating graft copolymer particles in one step from an aqueous emulsion of a copolymer comprising elastomeric base polymer chains and thermoplastic, non-elastomeric polymer side chains grafted thereon said side chains comprising structural units derived from styrene and acrylonitrile said method comprising subjecting said emulsion to mechanical shear in the absence of chemical coagulants, at least part of said emulsion being at a temperature greater than or equal to the glass transition temperature of the thermoplastic, non-elastomeric portion of said copolymer.

* * * * *